United States Patent
Ljung

(10) Patent No.: US 10,004,092 B2
(45) Date of Patent: *Jun. 19, 2018

(54) NETWORK-CONTROLLED TERMINAL-TO-TERMINAL DIRECT COMMUNICATION IN WIRELESS TELECOMMUNICATION NETWORK

(71) Applicant: Sony Mobile Communications AB, Lund (SE)

(72) Inventor: Rickard Ljung, Helsingborg (SE)

(73) Assignee: Sony Mobile Communications Inc., Tokyo (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/643,325

(22) Filed: Mar. 10, 2015

(65) Prior Publication Data

US 2015/0189684 A1    Jul. 2, 2015

Related U.S. Application Data

(63) Continuation of application No. 13/713,182, filed on Dec. 13, 2012, now Pat. No. 9,001,736.

(51) Int. Cl.
*H04W 72/04* (2009.01)
*H04W 76/02* (2009.01)
(Continued)

(52) U.S. Cl.
CPC ....... *H04W 76/023* (2013.01); *H04W 72/048* (2013.01); *H04W 92/18* (2013.01);
(Continued)

(58) Field of Classification Search
CPC ..... H04W 72/04; H04W 52/16; H04W 28/04; H04W 88/06
See application file for complete search history.

(56) References Cited

U.S. PATENT DOCUMENTS

| 2010/0009675 A1 | 1/2010 | Wijting et al. |
| 2012/0120794 A1* | 5/2012 | Sihn .................. H04W 76/023 370/230 |

(Continued)

FOREIGN PATENT DOCUMENTS

| CN | 102165840 A | 8/2011 |
| CN | 102172090 A | 8/2011 |

(Continued)

OTHER PUBLICATIONS

International Preliminary Report on Patentability for corresponding Application No. PCT/IB2013/060887 dated Jun. 25, 2015.

(Continued)

*Primary Examiner* — Andrew Lee
(74) *Attorney, Agent, or Firm* — Renner, Otto, Boisselle & Sklar, LLP

(57) ABSTRACT

A terminal configured to operate in a mobile telecommunication network includes a receiver configured to receive from a network entity other than another terminal a direct communication initiation signal including resource allocation information for establishing terminal-to-terminal direct communication between the terminal and a second terminal using a radio access technology (RAT) in which the terminal is configured to communicate when communicating with the second terminal through one or more base stations or (e)NB and a terminal-end terminal-to-terminal direct communication logic configured to establish terminal-to-terminal direct communication with the second terminal based on the resource allocation information provided by the network entity other than a terminal.

31 Claims, 8 Drawing Sheets

(51) Int. Cl.
  *H04W 92/18* (2009.01)
  *H04W 76/04* (2009.01)
  *H04W 88/06* (2009.01)
  *H04W 88/10* (2009.01)

(52) U.S. Cl.
  CPC .......... *H04W 76/043* (2013.01); *H04W 88/06* (2013.01); *H04W 88/10* (2013.01)

(56) References Cited

U.S. PATENT DOCUMENTS

| | | |
|---|---|---|
| 2013/0163555 A1 | 6/2013 | Turtinen et al. |
| 2013/0322345 A1 | 12/2013 | Vasudevan et al. |
| 2013/0324114 A1 | 12/2013 | Raghothaman et al. |
| 2014/0044024 A1 | 2/2014 | Zou et al. |
| 2014/0071950 A1 | 3/2014 | Jang et al. |
| 2014/0078971 A1 | 3/2014 | Bontu et al. |
| 2014/0086152 A1 | 3/2014 | Bontu et al. |
| 2014/0119306 A1 | 5/2014 | Yang et al. |
| 2014/0148177 A1 | 5/2014 | Ratasuk et al. |
| 2015/0117332 A1* | 4/2015 | Li .................... H04W 36/0055 370/329 |

FOREIGN PATENT DOCUMENTS

| | | |
|---|---|---|
| WO | 2010035100 A1 | 4/2010 |
| WO | WO 2010088428 A1 | 8/2010 |

OTHER PUBLICATIONS

Afif Osseiran et al., "Mobile and Wireless Communications for IMT-Advanced and Beyond", Aug. 22, 2014, Wiley, Chichester, U.K., ISBN: 1119993210, p. 212.

Office Action for corresponding U.S. Appl. No. 13/713,182 dated Jun. 26, 2014.

Office Action to corresponding Chinese Patent Application No. 201380065208.5, dated Dec. 25, 2017.

* cited by examiner

NETWORK-CONTROLLED TERMINAL-TO-TERMINAL DIRECT COMMUNICATION IN WIRELESS TELECOMMUNICATION NETWORK

TECHNICAL FIELD OF THE INVENTION

The technology of the present disclosure relates generally to portable electronic devices and transmission equipment operable in a wireless communication network and more particularly to systems and methods for network-controlled terminal-to-terminal direct communication.

DESCRIPTION OF THE RELATED ART

Wireless telecommunication networks utilize various different systems including Global System for Mobile Communications (GSM), Universal Mobile Telecommunications System (UMTS), and Long Term Evolution (LTE) systems among others that operate in various different frequency bands.

Portable electronic devices that operate in such wireless telecommunication networks, such as mobile telephones and smartphones, tablet computers, cellular-connected laptop computers, and similar devices are ever increasing in popularity. In a typical wireless telecommunication network, these devices, also known as terminals, mobile stations, and/or user equipment (UE), communicate via a radio access network (RAN) to one or more core networks.

FIG. 1 illustrates an exemplary radio access network (RAN) 10 that includes terminals 12a-e and base stations 16a-b. The network 10 also includes the core network 19, which is the part of the wireless telecommunication network that provides the various services to customers who are connected to the network 10.

The terminals 12a, 12c, and 12e communicate via base station 16a with the core network 19, while the terminals 12b and 12d communicate with the core network 19 via base station 16b.

Conventionally, a first terminal such as terminal 12a in a public wireless telecommunication network such as network 10 communicates with a second terminal such as terminal 12b by the terminal 12a connecting to the core network 19 via a respective base station such as base station 16a. From the core network 19 the communication path proceeds via another base station such as base station 16b to the second terminal 12b. Therefore, in order for the first terminal 12a to communicate with the second terminal 12b using the network's radio resources (e.g., allocated frequency spectrum) the communication signals from the terminals 12a and 12b are routed through at least one base station. Thus, conventionally communication between the terminals 12a and 12b uses substantial network infrastructure resources even where the terminals are physically close to each other.

SUMMARY

The concept of the systems and methods disclosed herein includes the addition of terminal-to-terminal communication to 3GPP technologies such as WCDMA and LTE.

To allow terminals to communicate directly between each other without the link being routed through a base station leads however to at least one issue regarding the allocated spectrum and its usage.

When terminals communicate through base stations, these spectrum resources are shared either in a time slot manner via time division duplexing (TDD) or a frequency division principle via frequency division duplexing (FDD) so that terminals have the possibility of transmitting data at certain resources or slots (i.e., time or frequency slots) while the base stations transmit data using other resources or slots. Allocations of resources or slots are controlled by the network and signaled to terminals via the base stations.

However, with terminal-to-terminal direct communication, resource allocation may be performed in various different ways.

One possibility would be to dedicate static resources that terminals may use for terminal-to-terminal direct communication. The static resources would be independent of any resources to be used by the base stations. With such a solution terminals may communicate using a 3GPP technology such as LTE or WCDMA without involving any network nodes or immediate operator control.

Another possibility as disclosed herein is for the operator's network infrastructure to control resources for terminal-to-terminal direct communication within 3GPP access systems.

Implementation of the concepts disclosed herein may require incorporation of such network controlled terminal-to-terminal direct communication into the 3GPP specifications including those specifying, for example, radio resource control specifications and physical layer specifications.

In one aspect of the invention, a terminal configured to operate in a mobile telecommunication network includes a receiver configured to receive from a network entity other than another terminal a direct communication initiation signal including resource allocation information for establishing terminal-to-terminal direct communication between the terminal and a second terminal using a radio access technology (RAT) in which the terminal is configured to communicate when communicating with the second terminal through one or more base stations or (e)NB. The terminal further includes a terminal-end terminal-to-terminal direct communication logic configured to establish terminal-to-terminal direct communication with the second terminal based on the resource allocation information provided by the network entity other than a terminal.

In one embodiment, the terminal-end terminal-to-terminal direct communication logic is configured to encode a direct communication connection request signal indicating that the terminal requests terminal-to-terminal direct communication with the second terminal, and the terminal further includes a transmitter configured to transmit to the network entity other than a terminal the direct communication connection request signal, and the receiver is configured to receive from the network entity other than a terminal, in response to the direct communication connection request signal, a direct communication connection accept signal indicating that the network entity other than a terminal accepts the direct communication connection request and will attempt to enable direct communication between the terminal and the second terminal.

In another embodiment, the terminal includes a proximity detection logic configured to detect proximity between the terminal and the second terminal, and wherein the terminal-end terminal-to-terminal direct communication logic is configured to encode the direct communication connection request signal based on the proximity detection logic detecting a predetermined proximity between the terminal and the second terminal.

In yet another embodiment, where prior to the receiver receiving from the network entity other than a terminal the direct communication initiation signal the terminal had established communication with the second terminal through one or more (e)NB, the receiving from the network entity other than a terminal the direct communication initiation signal is part of a handover process handing over communication between the terminal and the second terminal from communication through one or more base stations or (e)NB to terminal-to-terminal direct communication.

In one embodiment, the terminal-end terminal-to-terminal direct communication logic is configured to encode a direct communication disconnection request signal indicating that the terminal requests disconnection of the established terminal-to-terminal direct communication between the terminal and the second terminal, the transmitter is configured to transmit the direct communication disconnection request signal to the network entity other than a terminal, and the receiver is configured to receive from the network entity other than a terminal, in response to the direct communication disconnection request signal, a direct communication disconnection signal indicating that the established terminal-to-terminal direct communication between the terminal and the second terminal is to be disconnected.

In another embodiment, the receiving from the network entity other than a terminal the direct communication disconnection signal is part of a handover process handing over communication between the terminal and the second terminal from terminal-to-terminal direct communication to communication through one or more base stations or (e)NB.

In yet another embodiment, the receiver is configured to, prior to receiving from the network entity other than a terminal the direct communication initiation signal, receive a direct communication setup request signal from the network entity other than a terminal indicating that the second terminal requested terminal-to-terminal direct communication with the terminal, the terminal-end terminal-to-terminal direct communication logic is configured to encode a direct communication setup confirmation signal confirming receipt of the direct communication setup request signal, and the transmitter is configured to transmit the direct communication setup confirmation signal to the network entity other than a terminal.

In one embodiment, the receiver is configured to receive from the network entity other than a terminal a direct communication disconnection signal indicating that the established terminal-to-terminal direct communication between the terminal and the second terminal is to be disconnected.

In another aspect of the invention, a network entity other than a terminal configured to operate in a mobile telecommunication network includes a network-end terminal-to-terminal direct communication logic configured to encode direct communication initiation signals including resource allocation information for establishing terminal-to-terminal direct communication between a first terminal and a second terminal using a radio access technology (RAT) in which the first terminal and the second terminal are configured to communicate when communicating through one or more base stations or (e)NB. The network entity further includes a transmitter configured to transmit respective direct communication initiation signals to the first terminal and the second terminal.

In one embodiment, the network entity includes a receiver configured to, prior to the network-end terminal-to-terminal direct communication logic encoding the direct communication initiation signals, receive a direct communication connection request signal from the first terminal indicating that the first terminal requests terminal-to-terminal direct communication with the second terminal. In response to the direct communication connection request signal, the network-end terminal-to-terminal direct communication logic encodes a direct communication connection accept signal indicating to the first terminal that the network entity other than a terminal accepts the direct communication connection request and will attempt to enable direct communication between the first terminal and the second terminal and a direct communication setup request signal indicating to the second terminal that the first terminal requested terminal-to-terminal direct communication with the second terminal and that the network entity other than a terminal accepted the direct communication connection request and will attempt to enable direct communication between the first terminal and the second terminal. The transmitter is configured to transmit the direct communication connection accept signal to the first terminal and the direct communication setup request signal to the second terminal.

In another embodiment, the receiver is configured to receive from the second terminal a direct communication setup confirmation signal confirming receipt of the direct communication setup request signal.

In yet another embodiment, the network entity includes a proximity detection logic configured to, prior to the network-end terminal-to-terminal direct communication logic encoding the direct communication initiation signals, detect proximity between the first terminal and the second terminal. The network-end terminal-to-terminal direct communication logic is configured to encode the direct communication initiation signals based on the proximity detection logic detecting a predetermined proximity between the first terminal and the second terminal.

In one embodiment, communication had been established between the first terminal and the second terminal through one or more base stations or (e)NB prior to the transmitter transmitting the direct communication initiation signals. In this embodiment, the transmitter transmitting the direct communication initiation signals is part of a handover process handing over communication between the first terminal and the second terminal from communication through one or more (e)NB to terminal-to-terminal direct communication between the first terminal and the second terminal.

In another embodiment, the receiver is configured to receive a direct communication disconnection request signal from the first terminal or the second terminal indicating that the respective terminal requests disconnection of the established terminal-to-terminal direct communication between the first terminal and the second terminal, the network-end terminal-to-terminal direct communication logic is configured to, in response to the direct communication disconnection request signal, encode respective direct communication disconnection signals to be transmitted to the first terminal and the second terminal indicating that the established terminal-to-terminal direct communication between the first terminal and the second terminal is to be disconnected, and the transmitter is configured to transmit the direct communication disconnection signals to respective ones of the first terminal and the second terminal.

In yet another embodiment, the transmitter transmitting to the first terminal and to the second terminal the respective direct communication disconnection signals is part of a handover process handing over communication between the first terminal and the second terminal from terminal-to-terminal direct communication to communication through one or more base stations or (e)NB.

In yet another aspect of the invention, a method for network-controlled terminal-to-terminal direct communication in a mobile telecommunication network includes, at a first terminal, receiving from a network entity other than a terminal a direct communication initiation signal including resource allocation information for establishing terminal-to-terminal direct communication between the first terminal and a second terminal using a radio access technology (RAT) in which the first terminal is configured to communicate with the second terminal when communicating through one or more base stations or (e)NB, and establishing terminal-to-terminal direct communication with the second terminal based on the resource allocation information provided by the network entity other than a terminal.

In one embodiment, the method includes transmitting a direct communication connection request signal from the first terminal to the network entity other than a terminal indicating that the first terminal requests terminal-to-terminal direct communication with the second terminal, and receiving, in response to the direct communication connection request signal, a direct communication connection accept signal from the network entity other than a terminal indicating that the network entity other than a terminal accepts the direct communication connection request and will attempt to enable direct communication between the first terminal and the second terminal.

In another embodiment, the method includes, prior to receiving from the network entity other than a terminal the direct communication initiation signal, detecting proximity between the first terminal and the second terminal.

In yet another embodiment, prior to the receiving from the network entity other than a terminal the direct communication initiation signal, the first terminal had established communication with the second terminal through one or more base stations or (e)NB, and the receiving from the network entity other than a terminal the direct communication initiation signal is part of a handover process handing over communication between the first terminal and the second terminal from communication through one or more (e)NB to terminal-to-terminal direct communication.

In one embodiment, the method includes transmitting a direct communication disconnection request signal indicating that the first terminal requests disconnection of the established terminal-to-terminal direct communication between the first terminal and the second terminal, and receiving from a network entity other than a terminal, in response to the direct communication disconnection request signal, a direct communication disconnection signal indicating that the established terminal-to-terminal direct communication between the first terminal and the second terminal is to be disconnected.

In another embodiment, the receiving from the network entity other than a terminal the direct communication disconnection signal is part of a handover process handing over communication between the first terminal and the second terminal from terminal-to-terminal direct communication to communication through one or more base stations or (e)NB.

In yet another embodiment, the method includes, prior to receiving from the network entity other than a terminal the direct communication initiation signal, receiving a direct communication setup request signal from the network entity other than a terminal indicating that the second terminal requested terminal-to-terminal direct communication with the first terminal, and transmitting to the network entity other than a terminal a direct communication setup confirmation signal confirming receipt of the direct communication setup request signal.

In one embodiment, the method includes receiving from the network entity other than a terminal a direct communication disconnection signal indicating that the established terminal-to-terminal direct communication between the first terminal and the second terminal is to be disconnected.

In another aspect of the invention, a method for network-controlled terminal-to-terminal direct communication in a mobile telecommunication network includes, at a network entity other than a terminal, transmitting to a first terminal and to a second terminal respective direct communication initiation signals including resource allocation information for establishing terminal-to-terminal direct communication between the first terminal and the second terminal using a radio access technology (RAT) in which the first terminal and the second terminal are configured to communicate when communicating through one or more base stations or (e)NB.

In one embodiment, the method includes, prior to transmitting the direct communication initiation signals, receiving a direct communication connection request signal from the first terminal indicating that the first terminal requests terminal-to-terminal direct communication with the second terminal, and, in response to the direct communication connection request signal, transmitting to the first terminal a direct communication connection accept signal indicating that the network entity other than a terminal accepts the direct communication connection request and will attempt to enable direct communication between the first terminal and the second terminal and transmitting to the second terminal a direct communication setup request signal indicating that the first terminal requested terminal-to-terminal direct communication with the second terminal.

In another embodiment, the method includes receiving from the second terminal a direct communication setup confirmation signal confirming receipt of the direct communication setup request signal.

In yet another embodiment, the method includes, prior to transmitting to the first terminal and to the second terminal the respective direct communication initiation signals, detecting proximity between the first terminal and the second terminal.

In one embodiment, prior to the transmitting the direct communication initiation signals communication had been established between the first terminal and the second terminal through one or more base stations or (e)NB, and the transmitting the direct communication initiation signals is part of a handover process handing over communication between the first terminal and the second terminal from communication through one or more base stations or (e)NB to terminal-to-terminal direct communication between the first terminal and the second terminal.

In another embodiment, the method includes receiving a direct communication disconnection request signal from the first terminal or the second terminal indicating that the respective terminal requests disconnection of the established terminal-to-terminal direct communication between the first terminal and the second terminal, and, in response to the direct communication disconnection request signal, transmitting to the first terminal and to the second terminal respective direct communication disconnection signals indicating that the established terminal-to-terminal direct communication between the first terminal and the second terminal is to be disconnected.

In yet another embodiment, the transmitting to the first terminal and to the second terminal the respective direct communication disconnection signals is part of a handover process handing over communication between the first terminal and the second terminal from terminal-to-terminal direct communication to communication through one or more base stations or (e)NB.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto.

Features that are described and/or illustrated with respect to one embodiment may be used in the same way or in a similar way in one or more other embodiments and/or in combination with or instead of the features of the other embodiments.

It should be emphasized that the terms "comprises" and "comprising," when used in this specification, are taken to specify the presence of stated features, integers, steps or components but do not preclude the presence or addition of one or more other features, integers, steps, components or groups thereof.

DETAILED DESCRIPTION OF EMBODIMENTS

Figure 1:
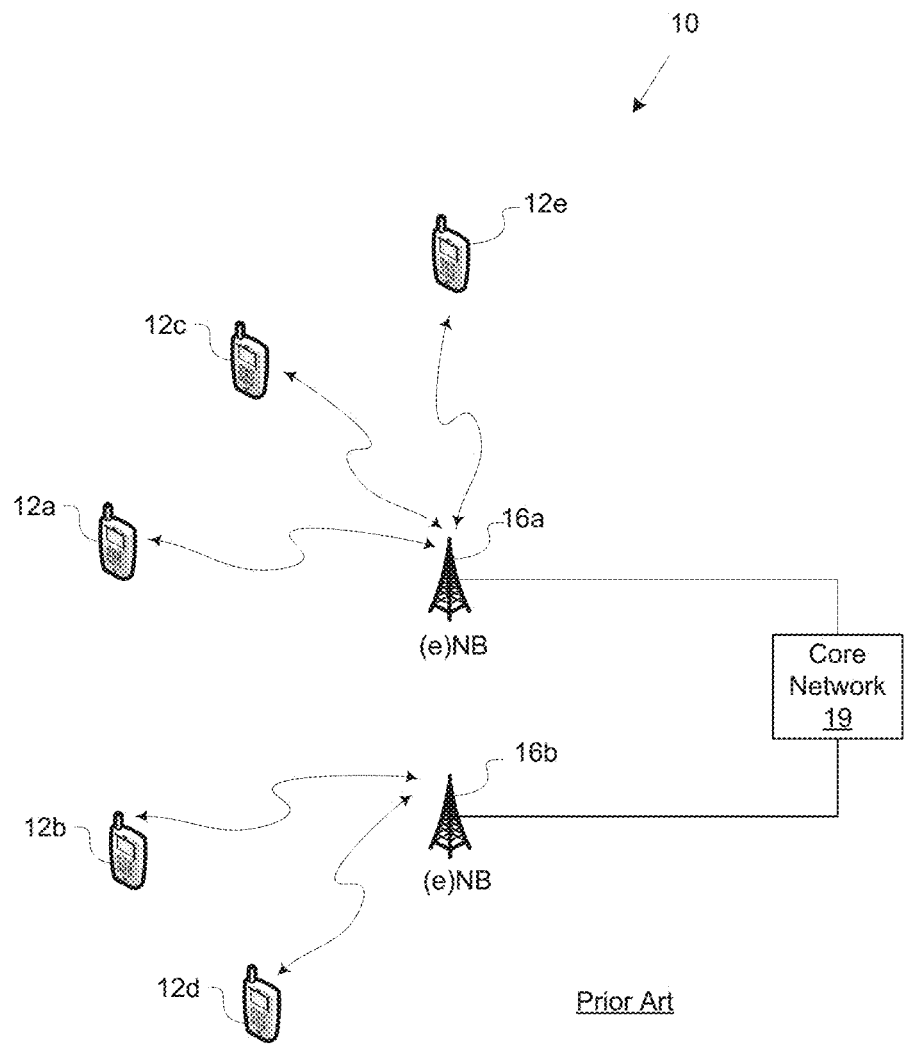
FIG. 1 illustrates an exemplary prior art radio access network (RAN).

Embodiments of the present invention will now be described with reference to the drawings, wherein like reference numerals are used to refer to like elements throughout. It will be understood that the figures are not necessarily to scale.

Figure 2:
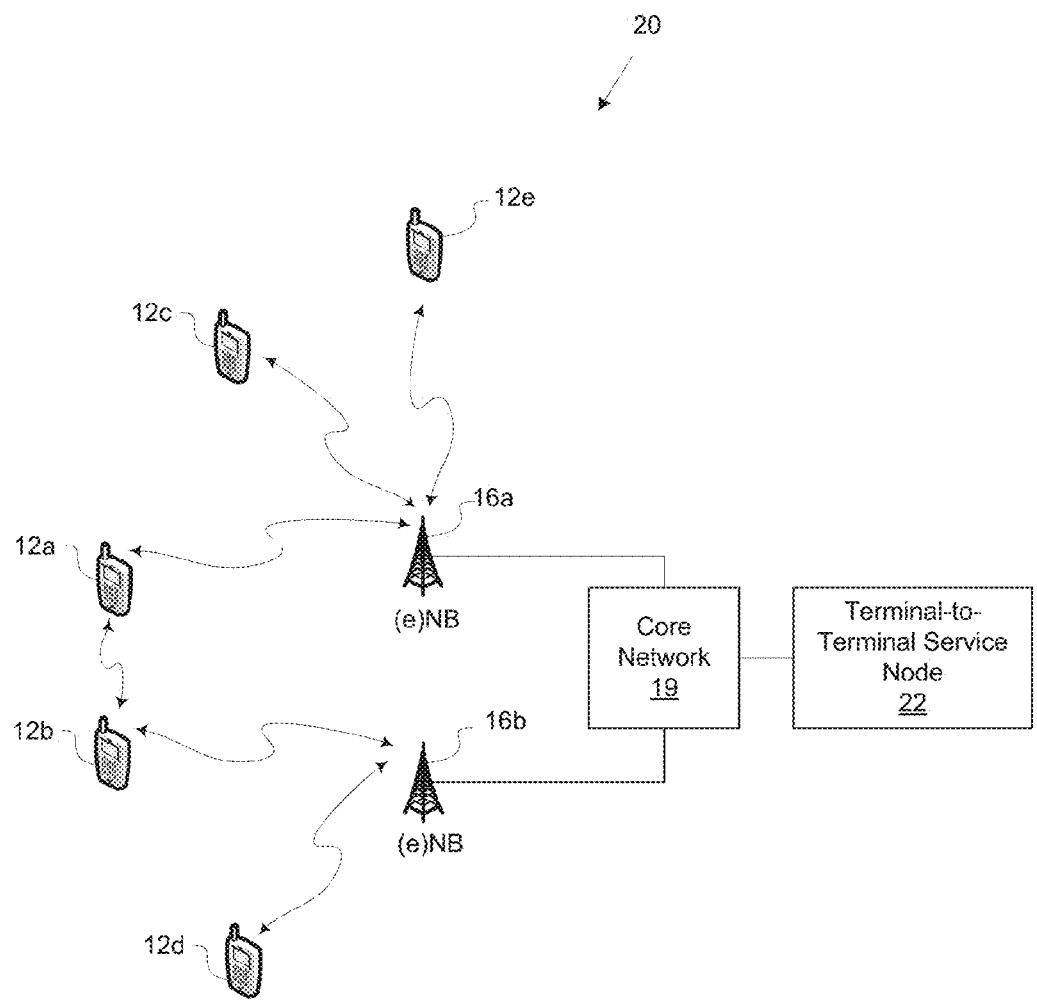
FIG. 2 illustrates an exemplary radio access network (RAN) for network controlled terminal-to-terminal direct communication.

FIG. 2 illustrates an exemplary radio access network (RAN) 20. In LTE the RAN is referred to as an Evolved Universal Terrestrial Radio Access Network (EUTRAN) while in UMTS the RAN is referred to as a Universal Terrestrial Radio Access Network (UTRAN).

The network 20 includes and provides service to terminals 12a-e. The terminals 12a-e are what in UMTS parlance is referred to as mobile stations (MS) or user equipment (UE), or what in LTE is referred to as user equipment (UE). In wireless telecommunications networks other than UMTS and LTE, including networks that are currently deployed as well as networks that are currently in development or that will be developed in the future, the terminals may be referred to by terms other than terminals, mobile stations, or user equipment. However, the term terminals as employed herein is intended to include those terminals in wireless telecommunications networks such as UMTS and LTE as well as networks other than UMTS and LTE, and terminals in yet to be developed or deployed networks where the terminals have similar functionality as the terminals described herein in the context of UMTS and LTE.

The network 20 further includes base stations 16a-b. A RAN such as network 20 covers a geographical area which is divided into cell areas with each cell area being served by a base station. The base station communicates over the air interface with the terminals within range of the base station. In UMTS the base stations 16a-b are known as NodeB (NB) and in LTE the base stations 16a-b are known as eNodeB (evolved NodeB or eNB). In wireless telecommunications networks other than UMTS and LTE, including networks that are currently deployed as well as networks that are currently in development or that will be developed in the future, the base stations may be referred to by terms other than base stations, NodeB, or eNodeB. However, the terms base station and (e)NB as employed herein are intended to include those base stations in wireless telecommunications networks such as UMTS and LTE as well as networks other than UMTS and LTE, and base stations in yet to be developed or deployed networks where the base stations have similar functionality as the base stations described herein in the context of UMTS and LTE.

The base stations 16a-b of the network 20 communicate with the terminals 12a-e using radio access technologies (RAT) including, for example, Wideband Code Division Multiple Access (WCDMA) via an air interface known as the Uu interface or UMTS air interface. The RAT used in LTE is known as LTE and the air interface is known as LTE-Uu.

Although the network 20 has been described as discreetly UMTS or LTE, respectively, in practice, base stations may be multi radio units, capable of transmitting in several different RAT. Moreover, different cells in the same base station may often use more than one frequency band. Due to the reuse of infrastructure at cellular sites, as well as backhaul capabilities, a single base station may be using more than one RAT and may be transmitting at more than one carrier frequency.

The network 20 also includes the core network 19, which, again, is the part of the wireless telecommunication network that provides the various services to customers who are connected to the network 20. Although in the example of FIG. 2 the base stations 16a-b are illustrated as connecting directly to the core network 19 as they may be in LTE, in other radio access technologies (RAT) such as UMTS (WCDMA) the base stations 16a-b may connect to the core network 19 via radio network controllers (RNC).

The terminals 12a, 12c, and 12e may communicate via base station 16a with the core network 19, while the terminals 12b and 12d may communicate with the core network 19 via base station 16b.

The network 20 further includes a terminal-to-terminal service node 22, which manages or controls terminal-to-terminal direct communication.

In the situation illustrated in FIG. 2, the terminal 12a is in relatively close physical proximity to the terminal 12b. The terminals 12a and 12b may be informed about other terminals within their proximity. Therefore, terminal 12a may learn about terminal 12b being proximate and vice versa.

Terminals in such a proximate situation that wish to connect to each other using terminal-to-terminal communication may transmit a terminal-to-terminal connection request to its serving base station or other entities in the network may transmit the connection request.

Figure 3:
FIG. 3 illustrates an exemplary signaling chart for network controlled terminal-to-terminal direct communication.

FIG. 3 illustrates an exemplary signaling chart for network controlled terminal-to-terminal direct communication.

In the illustration of FIG. 3, terminal 12a detects proximity of the terminal 12b. Terminal 12a transmits a terminal-to-terminal connection request to base station 16a requesting terminal-to-terminal communication with terminal 12b. Base station 16a forwards the request within the core network 19 to the terminal-to-terminal service node 22.

The terminal-to-terminal service node 22 receives the request and decides whether the terminals 12a and 12b will be allowed to connect directly and the network resources that the terminals would employ for such a direct connection.

The service node 22 or the terminals 12 or another entity in the network may keep a database correlating terminals that are preapproved to connect directly to each other, and the service node 22 may base its decision as to whether to allow the direct connection based on this information. For example, a user of terminal 12a may have created a list of terminals or users whose terminals are allowed to connect directly to the terminal 12b. In another example, the network operator may keep a register (e.g., via a website) correlating terminals that are allowed to connect directly to each other. In yet another example, terminal 12a simply dialing a telephone number associated with the terminal 12b may allow direct connection between the terminals as long as the terminals are proximate to each other and network resources (e.g., frequency spectrum bandwidth) are available.

If the service node 22 allows the connection, it transmits a terminal-to-terminal connection accept message via base station 16a to terminal 12a, which requested the connection. The service node 22 also transmits a regular connection setup request message to terminal 12b (and possibly additional terminals) within the core network 19 via the base station 16b. The base station 16b may transmit the connection setup message to the terminal 12b via a packet system (PS) or evolved packet system (EPS) paging message.

If the service node 22 does not accept the request from terminal 12a (not shown) the service node 22 instead transmits a terminal-to-terminal connection reject message to terminal 12a via base station 16a.

In the case where the service node 22 allows the connection and transmits the connection setup message to terminal 12b, the terminal 12b responds to the connection setup message with a connection setup confirmation to be transmitted to the service node 22. If the terminal 16b was not previously connected to the base station 16b, the terminal 16b initiates a connection with the base station 16b.

The service node 22 transmits terminal-to-terminal service initiation signals to the terminals 12a and 12b via base stations 16a and 16b, respectively, including resource allocation information to establish the terminal-to-terminal direct communication. The terminals 12a and 12b may then establish the terminal-to-terminal direct communication based on the resource allocation information. The terminals 12a-b communicate directly using a RAT (e.g., LTE, WCDMA, etc.), as allocated by the service node 22, in which the terminals 12a-b are capable of communicating when the terminals 12a-b communicate through the base stations 16a and 16b, respectively.

Although in FIGS. 2 and 3, the terminals 12a and 12b are illustrated as connected to different serving base stations 16a and 16b, respectively, the terminals 12a and 12b may be connected to the same base station. Hence the serving base station for the terminals about to establish terminal-to-terminal direct communication may be the same or different base stations.

Moreover, the terminals 12a and 12b are not required to be connected to the same RAT prior to establishing terminal-to-terminal direct communication. For example, prior to establishing terminal-to-terminal direct communication, the terminal 12a may be camping in an LTE cell, while the terminal 12b may be camping in a WCDMA cell.

The service node 22 determines the physical link to be setup as the terminal-to-terminal direct communication link between terminals 12a and 12b and transmits this information to the terminals 12a and 12b via the resource allocation information.

The service node 22 determines the physical link to be setup as the terminal-to-terminal direct communication link based on parameters such as terminal capabilities, available frequency spectrum resources, etc. At any time in the life of a terminal-to-terminal direct communication link, the service node 22 may transmit updated resource allocation information to the terminals 12a and 12b informing the terminals about changes to the allocated resources. The terminals would then update their direct communication based on the updated resource allocation information.

FIGS. 2 and 3 illustrate only one service node 22. However, a network may include several service nodes, each handling different parts of the complete network. Moreover, although the terminal-to-terminal service node 22 is illustrated as a separate physical entity from the base stations 16a-b and the core network 19, the service node 22 may be incorporated within other entities within an operator network, e.g., within a so-called serving gateway in LTE evolved packet core network, within a base station, and so on, and thus the service node 22 may be part of another network entity.

FIG. 3 further illustrates disconnection of the terminal-to-terminal direct communication. Disconnection could be requested by any terminal independent of which terminal initiated the direct communication. In the illustration of FIG. 3, terminal 12a requests disconnection by transmitting a disconnection request signal. In response, the service node 22 transmits a disconnection message to both terminals 12a and 12b. If more terminals than two are directly connected to terminal 16a, these terminals are informed in the same manner.

With this general protocol and functionality for terminal-to-terminal direct communication, two or more terminals within physical proximity of each other may connect using radio frequency resources fully controlled and dynamically changeable by the operator network.

The protocols and functionalities described herein may be included into 3GPP specifications for WCDMA and LTE systems. At least some of these protocols and functionalities may be included into radio resource control (RRC) signaling, described in 25.331 and 36.331 specifications for WCDMA and LTE respectively.

Figure 4:
FIG. 4 illustrates an exemplary signaling chart for network controlled terminal-to-terminal direct communication handovers.

FIG. 4 illustrates an exemplary signaling chart for network controlled terminal-to-terminal direct communication handovers.

The terminals 12a and 12b may be connected to each other via the base stations 16a and 16b as described above in reference to FIG. 1. The terminal 12a communicates via base station 16a with the core network 19, while the terminal 12b communicates with the core network 19 via base station 16b. As the terminals 12a and 12b become physically closer to each other (e.g., because either or both of the terminals 12a and 12b are moving) as illustrated in FIG. 2, the terminals 12a and 12b become physically close enough to each other that terminal-to-terminal direction communication between the terminals 12a and 12b is feasible. Based on the proximity detection, the system makes a determination that communication between the terminals 12a and 12b is to be handed over from communication via the base stations 16a and 16b to terminal-to-terminal direct communication.

In the illustrated embodiment of FIG. 4, the service node 22, aware of the proximity of terminal 12a to terminal 12b, transmits handover requests to base stations 16a and 16b requesting handover to terminal-to-terminal communication between the terminals 12a and 12b. The base stations 16a and 16b accepts the request.

In one embodiment (not shown), instead of the service node 22, one or both of terminals 12a and 12b, aware of the proximity of the terminals, transmit handover requests to base stations 16a and 16b, respectively, requesting handover to terminal-to-terminal communication between the terminals 12a and 12b.

The service node 22 then transmits connection setup request messages to terminal 12a and 12b within the core network 19 via the base stations 16a and 16b, respectively. The base stations 16a and 16b may transmit the connection setup messages via a packet system (PS) or evolved packet system (EPS) paging messages. The terminals 12a and 12b respond to the connection setup messages with connection setup confirmations.

The service node 22 then transmits terminal-to-terminal service initiation signals to the terminals 12a and 12b via base stations 16a and 16b, respectively, including resource allocation information to establish to terminal-to-terminal direct communication.

The terminals 12a and 12b may then establish the terminal-to-terminal direct communication based on the resource allocation information, completing the handover.

FIG. 4 further illustrates handover from terminal-to-terminal direct communication to communication via base stations. For example, as the terminals 12a and 12b become physically distant from each other (e.g., because either or both of the terminals 12a and 12b are moving), the terminals 12a and 12b become physically distant enough from each other that terminal-to-terminal direct communication between the terminals 12a and 12b is no longer feasible. Based on proximity detection, the system makes a determination that communication between the terminals 12a and 12b is to be handed over from terminal-to-terminal direct communication to communication via the base stations 16a and 16b.

In the illustrated embodiment, the service node 22, aware of the proximity of terminal 12a to terminal 12b, transmits handover requests to base stations 16a and 16b requesting handover to communication via the base stations 16a and 16b for the terminals 12a and 12b. The base stations 16a and 16b acknowledge the request.

In one embodiment (not shown), instead of the service node 22, one or both of terminals 12a and 12b, aware of the proximity of the terminals, transmit handover requests to base stations 16a and 16b, respectively, requesting handover to communication via the base stations 16a and 16b between the terminals 12a and 12b.

The base stations 16a and 16b then transmit regular connection setup request messages to terminal 12a and 12b, respectively. The terminals 12a and 12b may respond to the connection setup messages with connection setup confirmations to their respective base station 16a and 16b and communication via base stations 16a and 16b may be established.

Figure 5:
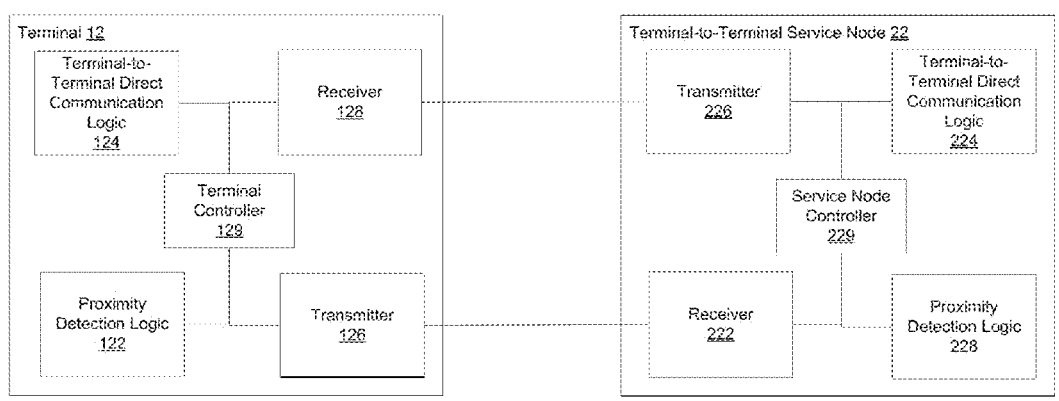
FIG. 5 illustrates a schematic diagram of a portion of the network of FIG. 2 including exemplary block diagrams of a terminal and a terminal-to-terminal service node.

FIG. 5 illustrates a schematic diagram of a portion of the network 20 including exemplary block diagrams of a terminal 12 and a terminal-to-terminal service node 22.

The terminal 12 includes a proximity detection logic 122 that detects proximity between the terminal 12 and another terminal. The proximity detection logic may include a near field communication (NFC) device, physical contact detection, a Bluetooth device, a GPS device, a tethered connection between the terminal 12 and the second terminal or any other proximity detection methodology. In one embodiment, the proximity detection logic 122 resides in a network entity other than the terminal 12 (e.g., the other terminal, a base station, core network, etc.).

The terminal 12 further includes a terminal-end terminal-to-terminal direct communication logic 124 that, based on the proximity detection logic 122 detecting a predetermined proximity between the terminal 12 and the other terminal, encodes a terminal-to-terminal direct communication connection request signal indicating that the terminal 12 requests terminal-to-terminal direct communication with the other terminal.

The terminal 12 also includes a transmitter 126 that transmits the direct communication connection request signal to the service node 22.

The terminal 12 also includes a receiver 128 that receives from the service node 22, in response to the direct communication connection request signal, a direct communication connection accept signal indicating the direct communication connection request was received and that the service node 22 will attempt to enable direct communication between the terminal 12 and the other terminal.

In the case where the other terminal and not the terminal 12 is the requester of terminal-to-terminal direct communication, the receiver 128 receives a direct communication setup request signal from the service node 22 indicating that the other terminal requested terminal-to-terminal direct communication with the terminal 12. In this case, the terminal-end terminal-to-terminal direct communication logic 124 encodes a direct communication setup confirmation signal confirming receipt of the direct communication setup request signal, and the transmitter 126 transmits the direct communication setup confirmation signal to the service node 22.

The receiver 128 further receives from the terminal-to-terminal service node 22 a direct communication initiation signal that includes resource allocation information for establishing terminal-to-terminal direct communication between the terminal 12 and the other terminal.

The terminal-end terminal-to-terminal direct communication logic 124 establishes terminal-to-terminal direct communication with the second terminal based on the resource allocation information.

In one embodiment, the terminal 12 may have established communication with the other terminal through one or more base stations or (e)NB prior to the receiver 128 receiving from the service node 22 the direct communication initiation signal. In this embodiment, the receiver 128 receiving from the service node 22 the direct communication initiation signal is part of a handover process handing over communication between the terminal 12 and the other terminal from communication through one or more base stations or (e)NB to terminal-to-terminal direct communication.

In one embodiment, the terminal-end terminal-to-terminal direct communication logic 124 encodes a direct communication disconnection request signal indicating that the terminal 12 requests disconnection of the terminal-to-terminal direct communication between the terminal 12 and the other terminal. The transmitter 126 transmits the direct communication disconnection request signal to the service node 22. The receiver 128 receives from the service node 22, in response to the direct communication disconnection request signal, a direct communication disconnection signal indicating that the terminal-to-terminal direct communication between the terminal and the second terminal is to be disconnected.

In one embodiment, the receiver 128 receiving from the service node 22 the direct communication disconnection signal is part of a handover process handing over communication between the terminal 12 and the other terminal from terminal-to-terminal direct communication to communication through one or more base stations or (e)NB.

The terminal 12 further includes a terminal controller 129 operatively connected to the proximity detection logic 122, the terminal-end terminal-to-terminal direct communication logic 124, the transmitter 126, and the receiver 128 to thereby control the terminal 12.

The terminal-to-terminal service node 22 includes a receiver 222 that receives the direct communication connection request signal from the terminal 12 indicating that the terminal 12 requests terminal-to-terminal direct communication with the other terminal.

The service node 22 further includes a network-end terminal-to-terminal direct communication logic 224 that, in response to the direct communication connection request signal, encodes (a) the direct communication connection accept signal indicating to the terminal 12 that the service node 12 accepts the direct communication connection request and will attempt to enable direct communication between the terminal 12 and the other terminal, and (b) the direct communication setup request signal indicating to the other terminal that the terminal 12 requested terminal-to-terminal direct communication and that the service node 22 accepted the direct communication connection request and will attempt to enable direct communication between the terminal 12 and the other terminal.

The service node 22 further includes a transmitter 226 that transmits the direct communication connection accept signal to the terminal 12 and the direct communication setup request signal to the other terminal.

In one embodiment, the receiver 222 also receives a direct communication setup confirmation signal confirming receipt of the direct communication setup request signal by the other terminal.

The network-end terminal-to-terminal direct communication logic 224 encodes direct communication initiation signals including resource allocation information for establishing terminal-to-terminal direct communication between the terminal 12 and the other terminal, and the transmitter 226 transmits the direct communication initiation signals to the terminal 12 and to the other terminal.

In one embodiment, the service node 22 includes a proximity detection logic 228 similar to the proximity detection logic 122 described above. In this embodiment, prior to the network-end terminal-to-terminal direct communication logic 224 encoding the direct communication initiation signals, the proximity detection logic 228 detects proximity between the terminal 12 and the other terminal, and the network-end terminal-to-terminal direct communication logic 224 encodes the direct communication initiation signals based on the proximity detection logic detecting a predetermined proximity between the terminal 12 and the other terminal. In this embodiment, the proximity detection logic 228 of the service node 22 detects proximity between the terminal 12 and the other terminal instead of or in addition to the proximity detection logic 122 of the terminal 12.

In one embodiment, the terminal 12 and the other terminal may have established communication through one or more base stations or (e)NB prior to the transmitter 226 transmitting the direct communication initiation signals. In this embodiment, the transmitter 226 transmitting the direct communication initiation signals is part of a handover process handing over communication between the terminal 12 and the other terminal from communication through one or more base stations or (e)NB to terminal-to-terminal direct communication.

In one embodiment, the receiver 222 receives a direct communication disconnection request signal from the terminal 12 or from the other terminal indicating that the respective terminal requests disconnection of the established terminal-to-terminal direct communication between the terminal 12 and the other terminal. In response to the direct communication disconnection request signal, the network-end terminal-to-terminal direct communication logic 224 encodes respective direct communication disconnection signals to be transmitted to the terminal 12 and to the other terminal indicating that the established terminal-to-terminal direct communication between the terminal 12 and the other terminal is to be disconnected. The transmitter 226 transmits the direct communication disconnection signals to the terminal 12 and the other terminal.

In one embodiment, the transmitter 226 transmitting to the terminal 12 and to the other terminal the direct communication disconnection signals is part of a handover process handing over communication between the terminal 12 and the other terminal from terminal-to-terminal direct communication to communication through one or more base stations or (e)NB.

The terminal-to-terminal service node 22 further includes a terminal controller 229 operatively connected to the proximity detection logic 228, the network-end terminal-to-terminal direct communication logic 224, the transmitter 226, and the receiver 222 to thereby control the service node 22.

The terminal-to-terminal service node 22 may be a discrete entity in the network or it may be incorporated within a terminal or within other entities other than a terminal within the network, e.g., within a so-called serving gateway in LTE evolved packet core network, within a base station, and so on. The network 20 may include multiple terminal-to-terminal service nodes.

Figure 6:
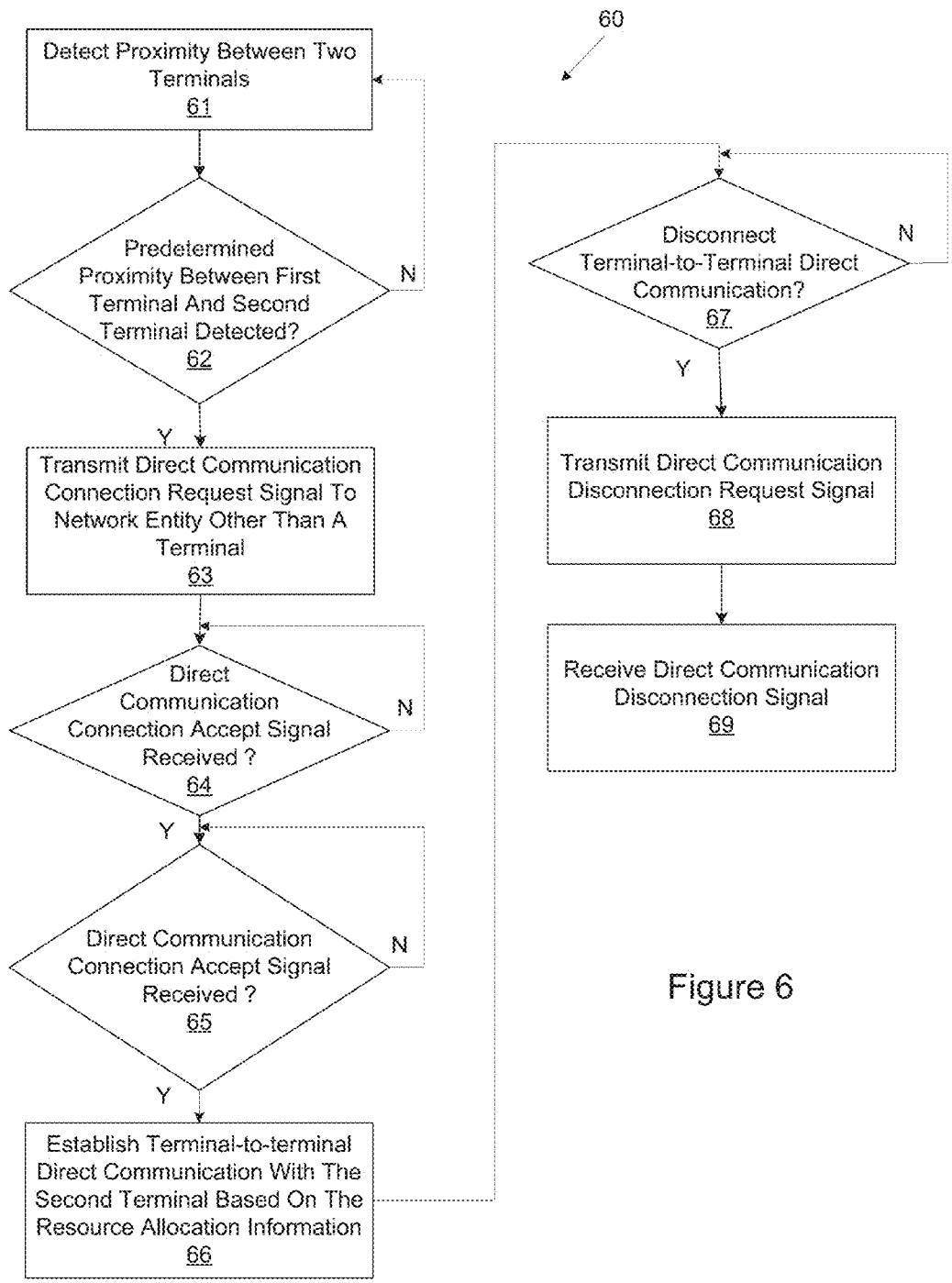
FIG. 6 illustrates a flow chart of an exemplary method for the terminal end of network-controlled terminal-to-terminal direct communication in a mobile telecommunication network.
Figure 7:
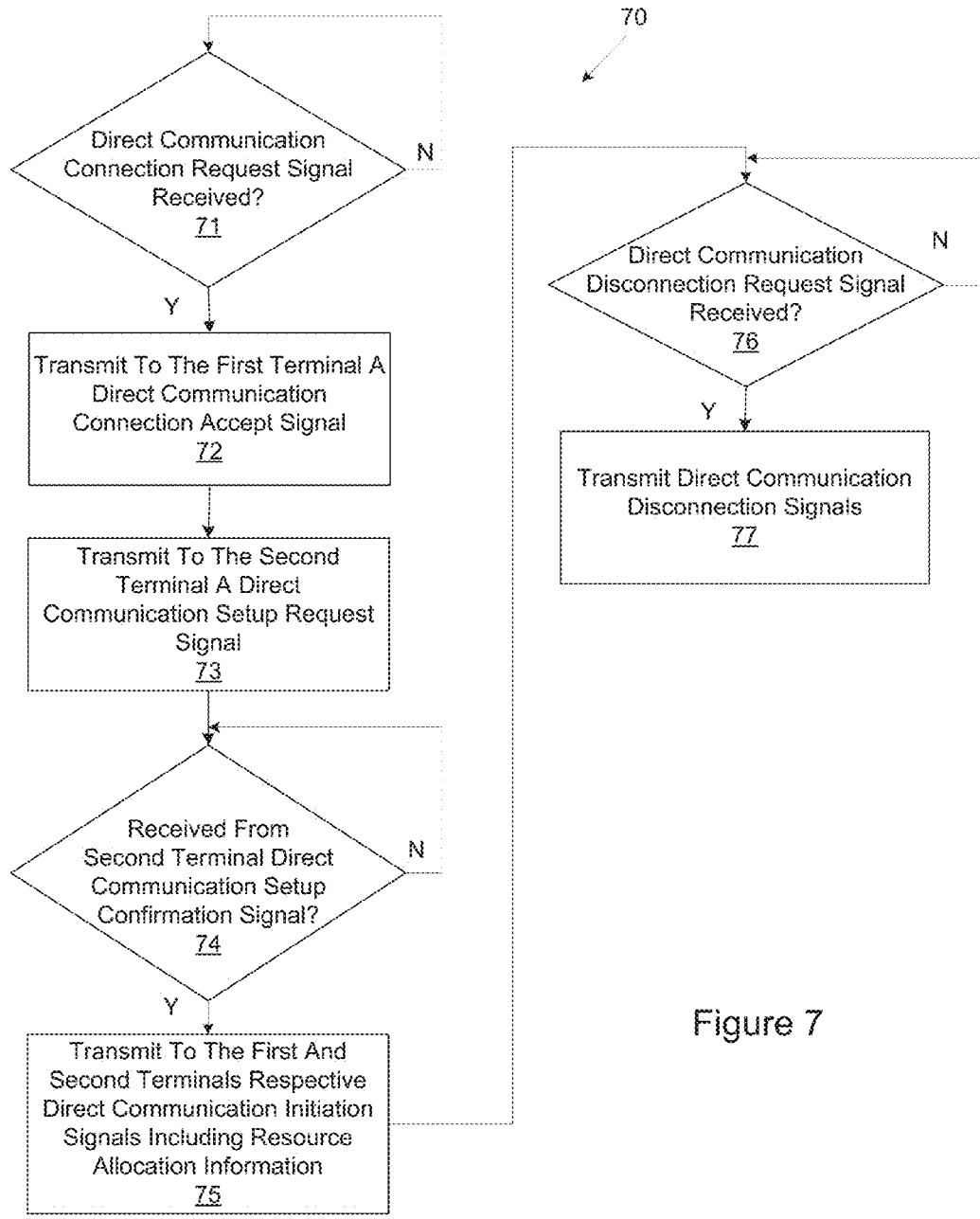
FIG. 7 illustrates a flow chart of an exemplary method for the network end of network-controlled terminal-to-terminal direct communication in a mobile telecommunication network.

In accordance with the above features, FIGS. 6 and 7 show flowcharts that illustrate logical operations to implement exemplary methods for network-controlled terminal-to-terminal direct communication in a mobile telecommunication network. The exemplary methods may be carried out by executing embodiments of the base stations, terminals, service nodes, mobile telephones, flash devices or machine-readable storage media disclosed herein, for example. Thus, the flowcharts of FIGS. 6 and 7 may be thought of as depicting steps of a method carried out in the above-disclosed systems or devices by operation of hardware, software, or combinations thereof. Although FIGS. 6 and 7 show a specific order of executing functional logic blocks, the order of executing the blocks may be changed relative to the order shown. Also, two or more blocks shown in succession may be executed concurrently or with partial concurrence. Certain blocks also may be omitted.

In reference to FIG. 6, logical flow of a method 60 for network-controlled terminal-to-terminal direct communication in a mobile telecommunication network includes at 61, detecting proximity between two terminals, a first terminal and a second terminal. At 62, if a predetermined proximity between the first terminal and the second terminal is not detected, return to 61, detecting proximity between the two terminals. If a predetermined proximity between the first terminal and the second terminal is detected, at 63 transmit a direct communication connection request signal from the first terminal to a network entity other than a terminal indicating that the first terminal requests terminal-to-terminal direct communication with the second terminal.

Next, at 64, if the terminal receives, in response to the direct communication connection request signal, a direct communication connection accept signal from the network entity other than a terminal indicating that the network entity other than a terminal accepts the direct communication connection request and will attempt to enable direct communication between the first terminal and the second terminal continue to 65. Otherwise, return to 64.

Next, at 65, if the terminal receives from the network entity other than a terminal a direct communication initiation signal including resource allocation information for establishing terminal-to-terminal direct communication between the first terminal and the second terminal using a radio access technology (RAT) in which the first terminal is configured to communicate with the second terminal when communicating through one or more base stations or (e)NB continue to 66. Otherwise, return to 65.

Next, at 66, establish terminal-to-terminal direct communication with the second terminal based on the resource allocation information provided by the network entity other than a terminal.

In one embodiment, prior to the receiving from the network entity other than a terminal the direct communication initiation signal, the first terminal had established communication with the second terminal through one or more base stations or (e)NB. In this embodiment, the receiving from the network entity other than a terminal the direct communication initiation signal is part of a handover process handing over communication between the first terminal and the second terminal from communication through one or more base stations or (e)NB to terminal-to-terminal direct communication.

At 67, if at the first terminal a determination is made to disconnect terminal-to-terminal direct communication, at 68, transmit a direct communication disconnection request signal indicating that the first terminal requests disconnection of the established terminal-to-terminal direct communication between the first terminal and the second terminal. At 69, in response to the direct communication disconnection request signal, the first terminal receives from a network entity other than a terminal, a direct communication disconnection signal indicating that the established terminal-to-terminal direct communication between the first terminal and the second terminal is to be disconnected.

In one embodiment, the receiving from the network entity other than a terminal the direct communication disconnection signal is part of a handover process handing over communication between the first terminal and the second terminal from terminal-to-terminal direct communication to communication through one or more base stations or (e)NB.

In one embodiment, the second terminal, prior to receiving from the network entity other than a terminal the direct communication initiation signal, receives a direct communication setup request signal from the network entity other than a terminal indicating that the first terminal requested terminal-to-terminal direct communication with the second terminal. In response, the second terminal transmits to the network entity other than a terminal a direct communication setup confirmation signal confirming receipt of the direct communication setup request signal.

Similarly, during disconnection, the second terminal receives from the network entity other than a terminal a direct communication disconnection signal indicating that the established terminal-to-terminal direct communication between the first terminal and the second terminal is to be disconnected.

In reference to FIG. 7, logical flow of a method 70 for network-controlled terminal-to-terminal direct communication in a mobile telecommunication network includes at 71, if at a network entity other than a terminal (e.g., a terminal-to-terminal service node), a direct communication connection request signal from a first terminal indicating that the first terminal requests terminal-to-terminal direct communication with a second terminal is not received, return to 71.

Otherwise, at 72, in response to the direct communication connection request signal, transmit to the first terminal a direct communication connection accept signal indicating that the network entity other than a terminal accepts the direct communication connection request and will attempt to enable direct communication between the first terminal and the second terminal.

Moreover, at 73, in response to the direct communication connection request signal, transmit to the second terminal a direct communication setup request signal indicating that the first terminal requested terminal-to-terminal direct communication with the second terminal.

In response, at 74, the network entity other than a terminal receives from the second terminal a direct communication setup confirmation signal confirming receipt of the direct communication setup request signal.

At 75, the method 70, transmits to the first and second terminals respective direct communication initiation signals including resource allocation information for establishing terminal-to-terminal direct communication between the first terminal and the second terminal using a radio access technology (RAT) in which the first terminal and the second terminal are configured to communicate when communicating through one or more base stations or (e)NB.

In one embodiment, the method includes, prior to transmitting to the first terminal and to the second terminal the respective direct communication initiation signals, detecting proximity between the first terminal and the second terminal. In this embodiment, the direct communication initiation signals are encoded based on detecting that a predetermined proximity exists between the first terminal and the second terminal. Proximity detection in this embodiment takes place instead of or in addition to the proximity detection at the first or the second terminals.

In one embodiment, where prior to the transmitting the direct communication initiation signals communication had been established between the first terminal and the second terminal through one or more base stations or (e)NB, the transmitting the direct communication initiation signals is part of a handover process handing over communication between the first terminal and the second terminal from communication through one or more base stations or (e)NB to the terminal-to-terminal direct communication.

At 76, if a direct communication disconnection request signal from the first terminal or the second terminal indicating that the respective terminal requests disconnection of the established terminal-to-terminal direct communication between the first terminal and the second terminal is not received, return to 76.

Otherwise, at 77, in response to the direct communication disconnection request signal, transmit to the first terminal and to the second terminal respective direct communication disconnection signals indicating that the established terminal-to-terminal direct communication between the first terminal and the second terminal is to be disconnected. Upon receipt the direct communication disconnection signals the terminals may disconnect the direct communication.

In one embodiment, the transmitting to the first terminal and to the second terminal the respective direct communication disconnection signals is part of a handover process handing over communication between the first terminal and the second terminal from terminal-to-terminal direct communication to communication through one or more base stations or (e)NB.

Figure 8:
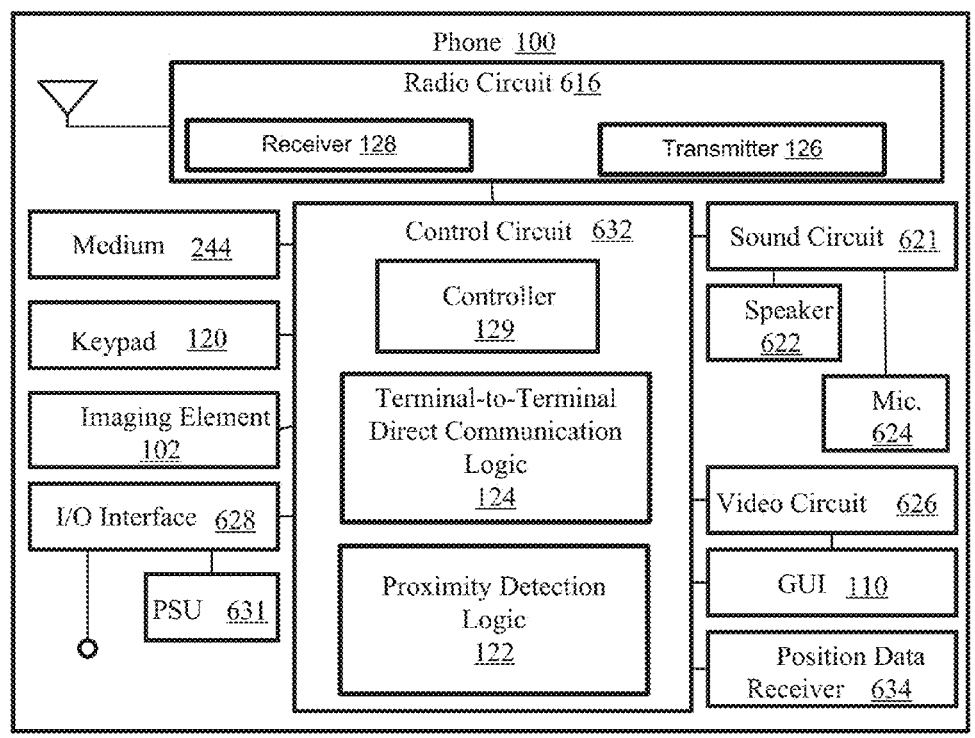
FIG. 8 illustrates a detailed block diagram of an exemplary terminal.

FIG. 8 illustrates a detailed block diagram of an exemplary terminal, which in the illustrated embodiment is represented by the mobile phone 100. The phone 100 includes a control circuit 632 that is responsible for overall operation of the phone 100. For this purpose, the control circuit 632 includes the terminal controller 129 that executes various applications, including applications related to or that form part of the phone 100 functioning as a terminal.

In one embodiment, functionality of the phone 100 acting as the terminal described above in reference to FIGS. 1-7 are embodied in the form of executable logic (e.g., lines of code, software, or a program) that is stored in the non-transitory computer readable medium 244 (e.g., a memory, a hard drive, etc.) of the phone 100 and is executed by the control circuit 632. The described operations may be thought of as a method that is carried out by the phone 100. Variations to the illustrated and described techniques are possible and, therefore, the disclosed embodiments should not be considered the only manner of carrying out phone 100 functions.

The phone 100 further includes the GUI 110, which may be coupled to the control circuit 632 by a video circuit 626 that converts video data to a video signal used to drive the GUI 110. The video circuit 626 may include any appropriate buffers, decoders, video data processors and so forth.

The phone 100 further includes communications circuitry that enables the phone 100 to establish communication connections such as a telephone call. In the exemplary embodiment, the communications circuitry includes a radio circuit 616. The radio circuit 616 includes one or more radio frequency transceivers including the receiver 128, the transmitter 126 and an antenna assembly (or assemblies). Since the phone 100 is capable of communicating using more than one standard or radio access technology (RAT), the radio circuit 616 including the receiver 128 and the transmitter 126 represents each radio transceiver and antenna needed for the various supported connection types. The radio circuit 616 including the receiver 128 and the transmitter 126 further represents any radio transceivers and antennas used for local wireless communications directly with an electronic device, such as over a Bluetooth interface.

As indicated, the phone 100 includes the primary control circuit 632 that is configured to carry out overall control of the functions and operations of the phone 100. The terminal controller 129 of the control circuit 632 may be a central processing unit (CPU), microcontroller or microprocessor. The terminal controller 129 executes code stored in a memory (not shown) within the control circuit 632 and/or in a separate memory, such as the machine-readable storage medium 244, in order to carry out operation of the phone 100. The machine-readable storage medium 244 may be, for example, one or more of a buffer, a flash memory, a hard drive, a removable media, a volatile memory, a non-volatile memory, a random access memory (RAM), or other suitable device. In a typical arrangement, the machine-readable storage medium 244 includes a non-volatile memory for long term data storage and a volatile memory that functions as system memory for the control circuit 632. The machine-readable storage medium 244 may exchange data with the control circuit 632 over a data bus. Accompanying control lines and an address bus between the machine-readable storage medium 244 and the control circuit 632 also may be present. The machine-readable storage medium 244 is considered a non-transitory computer readable medium. In one embodiment, data regarding the indication is stored in the machine-readable storage medium 244. Within the primary control circuit 632 are the proximity detection logic 122 and the terminal-to-terminal direct connection logic 124.

As described above, the proximity detection logic 122 and thus the phone 100 may include a near field communication (NFC) device, physical contact detection, a Bluetooth device, a GPS device, a tethered connection or any other proximity detection methodology.

The phone 100 may further include a sound circuit 621 for processing audio signals. Coupled to the sound circuit 621 are a speaker 622 and a microphone 624 that enable a user to listen and speak via the phone 100, and hear sounds generated in connection with other functions of the device 100. The sound circuit 621 may include any appropriate buffers, encoders, decoders, amplifiers and so forth.

The phone 100 may further include a keypad 120 that provides for a variety of user input operations as described above in reference to FIG. 1. The phone 100 may further include one or more input/output (I/O) interface(s) 628. The I/O interface(s) 628 may be in the form of typical electronic device I/O interfaces and may include one or more electrical connectors for operatively connecting the phone 100 to another device (e.g., a computer) or an accessory (e.g., a personal handsfree (PHF) device) via a cable. Further, operating power may be received over the I/O interface(s) 628 and power to charge a battery of a power supply unit (PSU) 631 within the phone 100 may be received over the I/O interface(s) 628. The PSU 631 may supply power to operate the phone 100 in the absence of an external power source.

The phone 100 also may include various other components. For instance, the imaging element 102 may be present for taking digital pictures and/or movies. Image and/or video files corresponding to the pictures and/or movies may be stored in the machine-readable storage medium 244. As another example, a position data receiver 634, such as a global positioning system (GPS) receiver, may be present to assist in determining the location of the phone 100.

Although the invention has been shown and described with respect to certain preferred embodiments, it is understood that equivalents and modifications will occur to others skilled in the art upon the reading and understanding of the specification. The present invention includes all such equivalents and modifications, and is limited only by the scope of the following claims.

What is claimed is:

1. A terminal configured to operate in a mobile telecommunication network, the terminal comprising:
   a proximity detection logic configured to detect proximity between the terminal and another terminal;
   a direct communication logic configured to, upon the proximity detection logic detecting a predetermined proximity between the terminal and the another terminal, encode a direct communication connection request signal indicating that the terminal requests direct communication with the another terminal;
a transmitter configured to transmit the direct communication connection request signal;
a receiver configured to, while the terminal communicates through a first base station, receive a signal including resource allocation information for establishing direct communication between the terminal and the another terminal while the another terminal communicates through a second base station different from the first base station; and
the direct communication logic configured to establish direct communication with the another terminal based on the resource allocation information.

2. The terminal of claim 1, wherein the receiver is configured to receive, in response to the direct communication connection request signal, a direct communication connection accept signal indicating that the direct communication connection request is accepted and that direct communication between the terminal and the another terminal will be enabled.

3. The terminal of claim 1, wherein
where prior to the receiver receiving the signal the terminal had established communication with the another terminal through one or more base stations, the receiving the signal is part of a handover process handing over communication between the terminal and the another terminal from communication through one or more base stations to direct communication.

4. The terminal of claim 1, wherein
the direct communication logic is configured to encode a direct communication disconnection request signal indicating that the terminal requests disconnection of the established direct communication between the terminal and the another terminal,
the transmitter is configured to transmit the direct communication disconnection request signal, and
the receiver is configured to receive, in response to the direct communication disconnection request signal, a direct communication disconnection signal indicating that the established direct communication between the terminal and the another terminal is to be disconnected.

5. The terminal of claim 4, wherein
the receiving the direct communication disconnection signal is part of a handover process handing over communication between the terminal and the another terminal from direct communication to communication through one or more base stations.

6. The terminal of claim 1, wherein
the receiver is configured to, prior to receiving the signal, receive a direct communication setup request signal indicating that the another terminal requested direct communication with the terminal,
the logic is configured to encode a direct communication setup confirmation signal confirming receipt of the direct communication setup request signal, and
the transmitter is configured to transmit the direct communication setup confirmation signal.

7. The terminal of claim 6, wherein
the receiver is configured to receive a direct communication disconnection signal indicating that the established direct communication between the terminal and the another terminal is to be disconnected.

8. The terminal of claim 1, wherein
the receiver is configured to receive the signal including resource allocation information for establishing direct communication between the terminal and the another terminal on a second frequency different from a first frequency on which the terminal communicates through the first base station; and
the direct communication logic is configured to establish direct communication with the another terminal on the second frequency.

9. A network entity configured to operate in a mobile telecommunication network, the network entity comprising:
a receiver configured to receive a direct communication connection request signal from a first terminal indicating that the first terminal detected a predetermined proximity between the first terminal and another terminal and that, at least in part based on the detected predetermined proximity, the first terminal requests direct communication with the another terminal;
a logic configured to encode signals including resource allocation information for, while the first terminal communicates through a first base station and the another terminal communicates through a second base station different from the first base station, establishing direct communication between the first terminal and the another terminal; and
a transmitter configured to transmit respective signals to the first terminal and the another terminal.

10. The network entity of claim 9, wherein
in response to the direct communication connection request signal, the logic encodes:
a direct communication connection accept signal indicating to the first terminal that the direct communication connection request is accepted and that direct communication between the first terminal and the another terminal will be attempted, and
a direct communication setup request signal indicating to the another terminal that the first terminal requested direct communication with the another terminal and that the direct communication connection request is accepted and that direct communication between the first terminal and the another terminal will be attempted,
the transmitter is configured to transmit the direct communication connection accept signal to the first terminal and the direct communication setup request signal to the another terminal.

11. The network entity of claim 10, wherein
the receiver is configured to receive from the another terminal a direct communication setup confirmation signal confirming receipt of the direct communication setup request signal.

12. The network entity of claim 9, wherein
communication had been established between the first terminal and the another terminal through one or more base stations prior to the transmitter transmitting the signals, and
the transmitter transmitting the signals is part of a handover process handing over communication between the first terminal and the terminal from communication through one or more base stations to the direct communication between the first terminal and the another terminal.

13. The network entity of claim 9, wherein
the receiver is configured to receive a direct communication disconnection request signal from the first terminal or the another terminal indicating that the respective terminal requests disconnection of the established direct communication between the first terminal and the another terminal, and the logic is configured to, in response to the direct communication disconnection request signal, encode respective direct communication disconnection signals to be transmitted to the first terminal and the another terminal indicating that the established direct communication between the first terminal and the another terminal is to be disconnected, and the transmitter is configured to transmit the direct communication disconnection signals to respective ones of the first terminal and the another terminal.

14. The network entity of claim 13, wherein
the transmitter transmitting to the first terminal and to the another terminal the respective direct communication disconnection signals is part of a handover process handing over communication between the first terminal and the another terminal from direct communication to communication through one or more base stations.

15. The network entity of claim 9, wherein:
the logic is configured to encode signals including resource allocation information for establishing direct communication between the first terminal and the another terminal on a second frequency on which the another terminal communicates through the second base station different from a first frequency on which the first terminal communicates through the first base station.

16. A method for network-controlled direct communication in a mobile telecommunication network, the method comprising:
at a first terminal, upon detecting a predetermined proximity between the first terminal and another terminal, transmitting a direct communication connection request signal indicating that the first terminal requests direct communication with the another terminal; and at the first terminal, receiving, in response to the direct communication connection request signal, a signal including resource allocation information for, while the first terminal communicates through a first base station and another terminal communicates through a second base station different from the first base station, establishing direct communication between the first terminal and the another terminal; and at the first terminal, establishing direct communication with the another terminal based on the resource allocation information.

17. The method of claim 16, comprising:
receiving, in response to the direct communication connection request signal, a direct communication connection accept signal indicating that the direct communication connection request is accepted and that direct communication between the first terminal and the another terminal will be attempted.

18. The method of claim 16, wherein
prior to the receiving the signal including resource allocation information, the first terminal had established communication with the another terminal through one or more base stations, and
the receiving the signal including resource allocation information is part of a handover process handing over communication between the first terminal and the another terminal from communication through one or more base stations to direct communication.

19. The method of claim 16, comprising:
transmitting a direct communication disconnection request signal indicating that the first terminal requests disconnection of the established direct communication between the first terminal and the another terminal; and
receiving, in response to the direct communication disconnection request signal, a direct communication disconnection signal indicating that the established direct communication between the first terminal and the another terminal is to be disconnected.

20. The method of claim 19, wherein
the receiving the direct communication disconnection signal is part of a handover process handing over communication between the first terminal and the another terminal from direct communication to communication through one or more base stations.

21. The method of claim 16, comprising:
prior to receiving the signal including resource allocation information, receiving a direct communication setup request signal indicating that the another terminal requested direct communication with the first terminal; and
transmitting a direct communication setup confirmation signal confirming receipt of the direct communication setup request signal.

22. The method of claim 21, comprising:
receiving a direct communication disconnection signal indicating that the established direct communication between the first terminal and the another terminal is to be disconnected.

23. The method of claim 16, wherein
the resource allocation information is indicative of resources of the direct communication that are assigned by a central network node configured to control the direct communication.

24. The method of claim 16, comprising:
at the first terminal, receiving the signal including resource allocation information for establishing direct communication between the first terminal and the another terminal on a second frequency different from a first frequency on which the first terminal communicates through the first base station; and
establishing direct communication with the another terminal on the second frequency.

25. A method for network-controlled direct communication in a mobile telecommunication network, the method comprising:
receiving from a first terminal a direct communication connection request signal indicating that the first terminal detected a predetermined proximity between the first terminal and another terminal and that, at least in part based on the detected predetermined proximity, the first terminal requests direct communication with the another terminal; and
transmitting to the first terminal and to the another terminal respective signals including resource allocation information for, while the first terminal communicates through a first base station and the another terminal communicates through a second base station different from the first base station, establishing direct communication between the first terminal and the another terminal.

26. The method of claim 25, comprising:
in response to the direct communication connection request signal,
transmitting to the first terminal a direct communication connection accept signal indicating that the direct communication connection request is accepted and that direct communication between the first terminal and the another terminal will be attempted, and transmitting to the another terminal a direct communication setup request signal indicating that the first terminal requested direct communication with the another terminal.

27. The method of claim 26, comprising:

receiving from the another terminal a direct communication setup confirmation signal confirming receipt of the direct communication setup request signal.

28. The method of claim 27, wherein prior to the transmitting the respective signals communication had been established between the first terminal and the another terminal through one or more base stations, and the transmitting the respective signals is part of a handover process handing over communication between the first terminal and the another terminal from communication through one or more base stations to the direct communication between the first terminal and the another terminal.

29. The method of claim 27, comprising:

receiving a direct communication disconnection request signal from the first terminal or the another terminal indicating that the respective terminal requests disconnection of the established direct communication between the first terminal and the another terminal; and in response to the direct communication disconnection request signal, transmitting to the first terminal and to the another terminal respective direct communication disconnection signals indicating that the established direct communication between the first terminal and the another terminal is to be disconnected.

30. The method of claim 29, wherein the transmitting to the first terminal and to the another terminal the respective direct communication disconnection signals is part of a handover process handing over communication between the first terminal and the another terminal from direct communication to communication through one or more base stations.

31. The method of claim 25, comprising:

transmitting to the first terminal and to the another terminal respective signals including resource allocation information for establishing direct communication between the first terminal and the another terminal on a second frequency on which the another terminal communicates through the second base station different from a first frequency on which the first terminal communicates through the first base station.

* * * * *

UNITED STATES PATENT AND TRADEMARK OFFICE
CERTIFICATE OF CORRECTION

PATENT NO. : 10,004,092 B2
APPLICATION NO. : 14/643325
DATED : June 19, 2018
INVENTOR(S) : Rickard Ljung Page 1 of 1

It is certified that error appears in the above-identified patent and that said Letters Patent is hereby corrected as shown below:

Column 21, Line 38 Claim 16:
Delete: "in response to the direct communication connection request signal,"

Signed and Sealed this
Second Day of October, 2018

Andrei Iancu
*Director of the United States Patent and Trademark Office*